US009560496B2

(12) United States Patent
Peng

(10) Patent No.: US 9,560,496 B2
(45) Date of Patent: Jan. 31, 2017

(54) END-OF-CALL SHORT MESSAGE IMPLEMENTATION METHOD AND APPARATUS BASED ON CTD

(71) Applicant: ZTE CORPORATION, Shenzhen, Guangdong Province (CN)

(72) Inventor: Lei Peng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/437,886

(22) PCT Filed: Aug. 6, 2013

(86) PCT No.: PCT/CN2013/080920
§ 371 (c)(1),
(2) Date: Apr. 23, 2015

(87) PCT Pub. No.: WO2014/082468
PCT Pub. Date: Jun. 5, 2014

(65) Prior Publication Data
US 2015/0296352 A1    Oct. 15, 2015

(30) Foreign Application Priority Data
Nov. 27, 2012   (CN) .......................... 2012 1 0490857

(51) Int. Cl.
*H04W 4/14*         (2009.01)
*H04W 4/16*         (2009.01)
*H04M 3/42*         (2006.01)

(52) U.S. Cl.
CPC ................. *H04W 4/14* (2013.01); *H04M 3/42* (2013.01); *H04W 4/16* (2013.01)

(58) Field of Classification Search
CPC ............. H04M 3/42; H04W 4/14; H04W 4/16
USPC ........... 455/412.2, 414.1, 466; 370/216, 350, 370/401, 433
See application file for complete search history.

(56) References Cited

U.S. PATENT DOCUMENTS

| 2004/0120504 | A1 | 6/2004 | Bushnell |
| 2009/0199114 | A1 | 8/2009 | Lewis et al. |
| 2012/0170733 | A1* | 7/2012 | Chauvel ................ H04M 1/723 379/142.17 |

FOREIGN PATENT DOCUMENTS

| CN | 101021927 A | 8/2007 |
| CN | 102148828 A | 8/2011 |
| EP | 1164803 A1 | 12/2001 |
| WO | 2012001016 A1 | 1/2012 |

* cited by examiner

*Primary Examiner* — Sam Bhattacharya
(74) *Attorney, Agent, or Firm* — Ling Wu; Stephen Yang; Ling and Yang Intellectual Property

(57) ABSTRACT

A method and apparatus for implementing an end-of-call short message based on click to dial are disclosed. The method includes: receiving a click to dial request of a network customer service, and establishing a call from a calling party to a called party; and judging whether a condition of triggering the end-of-call short message is satisfied, and if it is determined that the condition of triggering the end-of-call short message is satisfied, sending the end-of-call short message to a preset receiver of the end-of-call short message. The apparatus includes: a click to dial unit and a judgment unit. In the present document, by organically combining the CTD service and the end-of-call short message in websites of specific enterprises and stores, the enterprises and stores are better advertised.

6 Claims, 2 Drawing Sheets

END-OF-CALL SHORT MESSAGE IMPLEMENTATION METHOD AND APPARATUS BASED ON CTD

TECHNICAL FIELD

The present document relates to the field of communication technology, and particularly, to a method and apparatus for implementing an end-of-call short message based on click to dial.

BACKGROUND

A Click To Dial (CTD) service is a call type service in which speech channels of phone numbers of two parties or multi parties whom a user wishes to call are bridged through the CTD service so as to implement a two-party or multi-party call. A traditional call service is implemented by the user directly dialing a destination telephone number through a terminal (such as a fixed telephone or a mobile phone, etc.). However, the CTD call is a call in which a CTD Access Service (CTD AS) server respectively initiates two channels or multi channels of phone numbers required to be called and then bridge the two parties or multi parties required to be called after they give responses.

The end-of-call short message refers to an end-of-call short message preset by the enterprise that will be received by a mobile phone subscriber after making a client fixed phone call and the call ends, and the short message contents can be enterprise profiles, product introductions, promotion activities and festival greeting messages and so on, which can be modified at any time. But applications of the CTD service and the end-of-call short message in websites of specific enterprises or stores are still required to be further developed at present, so as to better advertise the enterprises and stores.

SUMMARY

In view of the above analysis, the present document is to provide a method and apparatus for implementing an end-of-call short message based on click to dial, to organically combine the CTD service and the end-of-call short message in websites of specific enterprises and stores, thereby better advertising the enterprises and stores.

The object of the present document is mainly implemented through the following technical scheme.

A method for implementing an end-of-call short message based on click to dial comprises:
  receiving a click to dial request of a network customer service, and establishing a call from a calling party to a called party; and
  judging whether a condition of triggering the end-of-call short message is satisfied, and if it is determined that the condition of triggering the end-of-call short message is satisfied, sending the end-of-call short message to a preset receiver of the end-of-call short message.

The step of determining that the condition of triggering the end-of-call short message is satisfied, and sending the end-of-call short message to a preset receiver of the end-of-call short message comprises:
  if the condition of triggering the end-of-call short message is satisfied, judging whether the preset receiver of the end-of-call short message is a mobile phone number, and when the preset receiver of the end-of-call short message is the mobile phone number, sending the end-of-call short message to the preset receiver of the end-of-call short message.

The step of sending the end-of-call short message to the preset receiver of the end-of-call short message when the preset receiver of the end-of-call short message is the mobile phone number comprises:
  judging whether the receiver of the end-of-call short message is one party or two parties of the calling party and the called party, and when it is determined that the receiver of the end-of-call short message is the calling party and/or the called party, sending the end-of-call short message to the determined receiver.

The method further comprises:
  before sending the end-of-call short message to the preset receiver of the end-of-call short message, judging whether the end-of-call short message is required to be sent with delay, when it is determined that the end-of-call short message is required to be sent with delay, presetting a preset delay, and sending the end-of-call short message to the preset receiver of the end-of-call short message after the preset delay times out.

The condition of triggering the end-of-call short message comprises:
  the called party being busy, no answer from the called party, or a click to dial call ending.

An apparatus for implementing an end-of-call short message based on click to dial comprises:
  a click to dial unit, configured to: establish a call from a calling party to a called party when a click to dial request of a network customer service is received; and
  a judgment unit, configured to: judge whether a condition of triggering the end-of-call short message is satisfied, and if it is determined that the condition of triggering the end-of-call short message is satisfied, send the end-of-call short message to a preset receiver of the end-of-call short message.

The judgment unit is further configured to: when it is determined that the condition of triggering the end-of-call short message is satisfied, judge whether the preset receiver of the end-of-call short message is a mobile phone number, and when the preset receiver of the end-of-call short message is the mobile phone number, send the end-of-call short message to the preset receiver of the end-of-call short message.

The judgment unit is further configured to: when it is determined that the receiver of the end-of-call short message is the mobile phone number, judge whether the receiver of the end-of-call short message is one party or two parties of the calling party and the called party, and when it is determined that the receiver of the end-of-call short message is the calling party and/or the called party, send the end-of-call short message to the determined receiver.

The judgment unit is further configured to: before sending the end-of-call short message to the preset receiver of the end-of-call short message, judge whether the end-of-call short message is required to be sent with delay, when it is determined that the end-of-call short message is required to be sent with delay, preset a preset delay, and send the end-of-call short message to the preset receiver of the end-of-call short message after the preset delay times out.

The condition of triggering the end-of-call short message comprises: the called party being busy, no answer from the called party, or a click to dial call ending.

The beneficial effects of the present document are described as follows.

With the method and apparatus for implementing an end-of-call short message based on click to dial provided in the example of the present document, by the calling party initiating a click to dial request in the network, a click to dial end-of-call short message service establishes a call between the calling party and the called party, and before the call, during the call process and when the call ends, judges whether a condition of triggering the end-of-call short message is satisfied, and if it is determined that the condition of triggering the end-of-call short message is satisfied, sends the end-of-call short message to a preset receiver of the end-of-call short message.

Other characteristics and advantages of the present document will be illustrated in the following descriptions, and they will become partly apparent from the descriptions or be known by implementing the present document. The object and other advantages of the present document can be achieved and obtained through the structures particularly pointed out in the written descriptions, claims and accompanying drawings.

PREFERRED EMBODIMENTS OF THE DOCUMENT

The preferred examples of the present document will be described in detail in combination with the accompanying drawings, wherein, the accompanying drawings constitute a part of the present document, and they are used for illustrating the principle of the present document together with the examples of the present document.

Example 1

Figure 1:
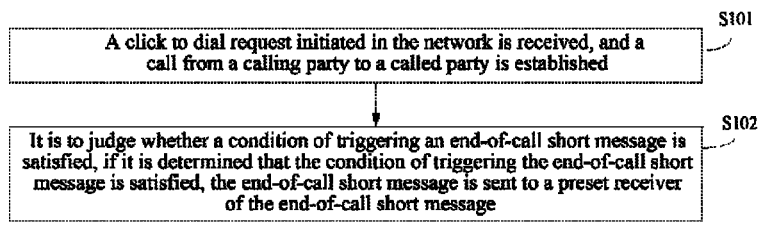
FIG. 1 is a flow diagram of a method for implementing an end-of-call short message based on click to dial in the example 1 of the present document.

The example of the present document provides a method for implementing an end-of-call short message based on click to dial, and with reference to FIG. 1, the method includes the following steps.

In step S101, a click to dial request of a network customer service is received, and a call from a calling party to a called party is established.

In step S102, it is to judge whether a condition of triggering the end-of-call short message is satisfied, if it is determined that the condition of triggering the end-of-call short message is satisfied, the end-of-call short message is sent to a preset receiver of the end-of-call short message.

In the example of the present document, by organically combining the CTD service and the end-of-call short message in websites of specific enterprises and stores, the enterprises and stores are better advertised.

Wherein, the condition of triggering the end-of-call short message in the example of the present document includes: the called party being busy, no answer from the called party, or a click to dial call ending.

Wherein, the end-of-call short message includes enterprise profiles, product introductions, promotion activities and festival greetings and so on.

With the method for implementing an end-of-call short message based on click to dial provided in the example of the present document, by the calling party initiating a click to dial request in the network, a click to dial end-of-call short message service establishes a call between the calling party and the called party, and before the call, during the call process and when the call ends, judges whether a condition of triggering the end-of-call short message is satisfied, and if it is determined that the condition of triggering the end-of-call short message is satisfied, sends the end-of-call short message to a preset receiver of the end-of-call short message.

Example 2

Figure 2:
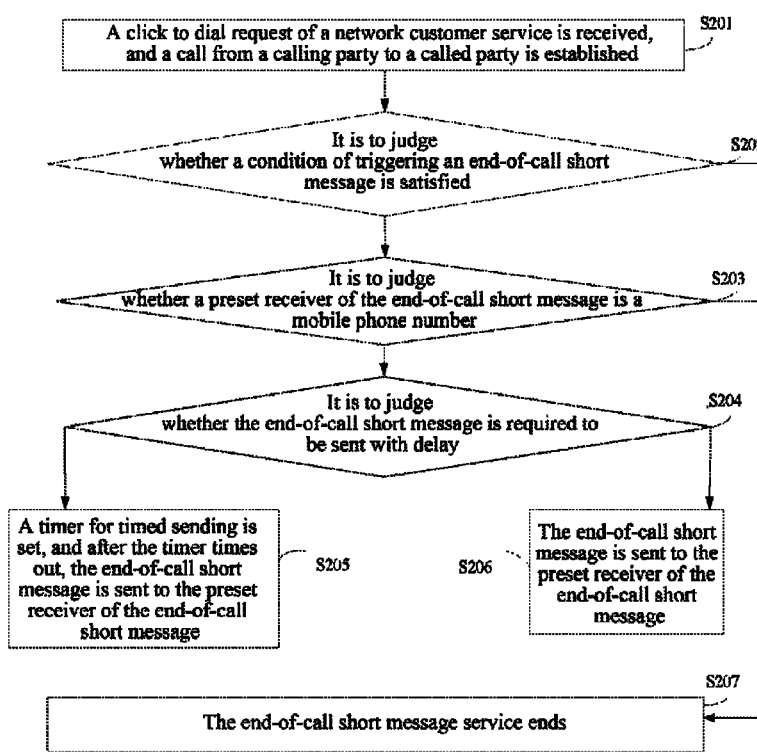
FIG. 2 is a flow diagram of a method for implementing an end-of-call short message based on click to dial in the example 2 of the present document.

The example of the present document provides a method for implementing an end-of-call short message based on click to dial, and with reference to FIG. 2, the method includes the following steps.

In step S201, a click to dial request of a network customer service is received, and a call from a calling party to a called party is established.

In step S202, it is to judge whether a condition of triggering the end-of-call short message is satisfied, if yes, it proceeds to step S203, and if no, it proceeds to step S207.

Wherein, the condition of triggering the end-of-call short message in the example of the present document includes:
the called party being busy, no answer from the called party, or a click to dial call ending.

In step S203, it is to judge whether a preset receiver of the end-of-call short message is a mobile phone number, if yes, it proceeds to step S204, and if no, it proceeds to step S207.

In step S204, it is to judge whether the end-of-call short message is required to be sent with delay, if yes, it proceeds to step S205, and if no, it proceeds to step S206.

In step S205, a timer for timing sending is set, and after the timer times out, the end-of-call short message is sent to the preset receiver of the end-of-call short message.

In step S206, the end-of-call short message is sent to the preset receiver of the end-of-call short message.

Wherein, before the end-of-call short message is sent to the preset receiver of the end-of-call short message, it is required to further judge whether the receiver of the end-of-call short message is the calling party or the called party;
   when the receiver of the end-of-call short message is the calling party, the end-of-call short message is sent to the calling party;
   when the receiver of the end-of-call short message is the called party, the end-of-call short message is sent to the called party; and
   when the receiver of the end-of-call short message is the calling party and the called party, the end-of-call short message is sent to the calling party and the called party.

In step S207, the end-of-call short message service ends.

Wherein, the end-of-call short message in the example of the present document includes enterprise profiles, product introductions, promotion activities and festival greetings and so on.

Example 3

Figure 3:
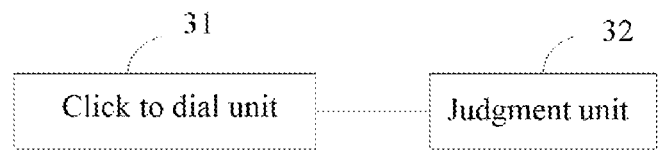
FIG. 3 is a schematic diagram of an apparatus for implementing an end-of-call short message based on click to dial in the example 3 of the present document.

The example of the present document provides an apparatus for implementing an end-of-call short message based on click to dial, and with reference to FIG. 3, the apparatus includes:

a click to dial unit 31, configured to: when receiving a click to dial request of a network customer service, establish a call from a calling party to a called party; and a judgment unit 32, configured to: judge whether a condition of triggering the end-of-call short message is satisfied, and if it is determined that the condition of triggering the end-of-call short message is satisfied, send the end-of-call short message to a preset receiver of the end-of-call short message.

Example 4

The example of the present document provides an apparatus for implementing an end-of-call short message based on click to dial, and the apparatus includes:

a click to dial unit, configured to: when receiving a click to dial request of a network customer service, establish a call from a calling party to a called party; and a judgment unit, configured to: judge whether a preset receiver of the end-of-call short message is a mobile phone number, when it is determined that the preset receiver of the end-of-call short message is the mobile phone number, further judge whether the receiver of the end-of-call short message is one party or two parties of the calling party and the called party, when it is determined that the receiver of the end-of-call short message is the calling party and/or the called party, further judge whether the end-of-call short message is required to be sent with delay, when it is determined that the end-of-call short message is required to be sent with delay, preset a preset delay, and send the end-of-call short message to the preset receiver of the end-of-call short message after the preset delay times out. A timer for timing sending is set in the example of the present document, and after the timer times out, the end-of-call short message is sent to the preset receiver of the end-of-call short message.

The condition of triggering the end-of-call short message includes:

the called party being busy, no answer from the called party, or a click to dial call ending.

In conclusion, with the method and apparatus for implementing an end-of-call short message based on click to dial provided in the example of the present document, by the calling party initiating a click to dial request in the network, a click to dial end-of-call short message service establishes a call between the calling party and the called party, and before the call, during the call process and when the call ends, judges whether a condition of triggering the end-of-call short message is satisfied, and if it is determined that the condition of triggering the end-of-call short message is satisfied, sends the end-of-call short message to a preset receiver of the end-of-call short message.

The above description is only the preferred specific embodiments of the present document, but the protection scope of the present document is not limited to this, changes or substitutions that can be easily conceived by any skilled familiar to the art within the technical scope disclosed by the present document shall be all covered within the protection scope of the present document. Therefore, the protection scope of the present document should be subject to the protection scope of the claims.

INDUSTRIAL APPLICABILITY

Compared with the related art, with the method and apparatus provided in the example of the present document, by organically combining the CTD service and the end-of-call short message in websites of specific enterprises and stores, the enterprises and stores are better advertised.

What is claimed is:

1. A method for implementing an end-of-call short message based on click to dial, comprising:

receiving a click to dial request of a network customer service, and establishing a call from a calling party to a called party; and judging whether a condition of triggering the end-of-call short message is satisfied, and if it is determined that the condition of triggering the end-of-call short message is satisfied, sending the end-of-call short message to a preset receiver of the end-of-call short message;

wherein, the step of determining that the condition of triggering the end-of-call short message is satisfied, and sending the end-of-call short message to a preset receiver of the end-of-call short message comprises:

if the condition of triggering the end-of-call short message is satisfied, judging whether the preset receiver of the end-of-call short message is a mobile phone number, and when the preset receiver of the end-of-call short message is the mobile phone number, sending the end-of-call short message to the preset receiver of the end-of-call short message;

wherein, the step of sending the end-of-call short message to the preset receiver of the end-of-call short message when the preset receiver of the end-of-call short message is the mobile phone number comprises:

judging whether the receiver of the end-of-call short message is one party or two parties of the calling party and the called party, and when it is determined that the receiver of the end-of-call short message is the calling party and/or the called party, sending the end-of-call short message to the determined receiver.

2. The method according to claim 1, further comprising:

before sending the end-of-call short message to the preset receiver of the end-of-call short message, judging whether the end-of-call short message is required to be sent with delay, when it is determined that the end-of-call short message is required to be sent with delay, presetting a preset delay, and sending the end-of-call short message to the preset receiver of the end-of-call short message after the preset delay times out.

3. The method according to claim 1, wherein, the condition of triggering the end-of-call short message comprises:

the called party being busy, no answer from the called party, or a click to dial call ending.

4. An apparatus for implementing an end-of-call short message based on click to dial, comprising:

a click to dial unit, configured to: establish a call from a calling party to a called party when a click to dial request of a network customer service is received; and a judgment unit, configured to: judge whether a condition of triggering the end-of-call short message is satisfied, and if it is determined that the condition of triggering the end-of-call short message is satisfied, send the end-of-call short message to a preset receiver of the end-of-call short message;

wherein the judgment unit is further configured to: when it is determined that the condition of triggering the end-of-call short message is satisfied, judge whether the preset receiver of the end-of-call short message is a mobile phone number, and when the preset receiver of the end-of-call short message is the mobile phone number, send the end-of-call short message to the preset receiver of the end-of-call short message;

the judgment unit is further configured to: when it is determined that the receiver of the end-of-call short message is the mobile phone number, judge whether the receiver of the end-of-call short message is one party or two parties of the calling party and the called party, and when it is determined that the receiver of the end-of-call short message is the calling party and/or the called party, send the end-of-call short message to the determined receiver.

5. The apparatus according to claim 4, wherein, the judgment unit is further configured to: before sending the end-of-call short message to the preset receiver of the end-of-call short message, judge whether the end-of-call short message is required to be sent with delay, when it is determined that the end-of-call short message is required to be sent with delay, preset a preset delay, and send the end-of-call short message to the preset receiver of the end-of-call short message after the preset delay times out.

6. The apparatus according to claim 4, wherein, the condition of triggering the end-of-call short message comprises: the called party being busy, no answer from the called party, or a click to dial call ending.

\* \* \* \* \*